United States Patent
Nelson et al.

(10) Patent No.: US 8,561,736 B2
(45) Date of Patent: Oct. 22, 2013

(54) ADJUSTABLE MID-WHEEL POWER WHEELCHAIR DRIVE SYSTEM

(75) Inventors: Richard L. Nelson, Newburgh, IN (US); Robert M. Levy, Terre Haute, IN (US)

(73) Assignee: Rehabilitation Research of Evansville, Inc., Evansville, IN (US)

( * ) Notice: Subject to any disclaimer, the term of this patent is extended or adjusted under 35 U.S.C. 154(b) by 366 days.

(21) Appl. No.: 12/903,435

(22) Filed: Oct. 13, 2010

(65) Prior Publication Data

US 2011/0083915 A1    Apr. 14, 2011

Related U.S. Application Data

(60) Provisional application No. 61/250,918, filed on Oct. 13, 2009.

(51) Int. Cl.
*B60K 1/00* (2006.01)
*A61G 5/06* (2006.01)

(52) U.S. Cl.
CPC ............ *A61G 5/061* (2013.01); *Y10S 180/907* (2013.01)
USPC ......................................... 180/65.1; 180/907

(58) Field of Classification Search
CPC ...................................................... A61G 5/043
USPC ............... 180/65.1, 65.51, 907, 908, 209, 22, 180/24.02, 11, 15, 19, 19.3, 23; 280/250.1, 280/304.1
See application file for complete search history.

(56) References Cited

U.S. PATENT DOCUMENTS

| 2,495,573 | A |   | 1/1950  | Duke  |         |
|-----------|---|---|---------|-------|---------|
| 2,931,449 | A | * | 4/1960  | King  | 180/8.2 |
| 3,964,786 | A |   | 6/1976  | Mashuda |       |
| 4,119,163 | A | * | 10/1978 | Ball  | 180/6.5 |
| 4,387,325 | A |   | 6/1983  | Klimo |         |

(Continued)

FOREIGN PATENT DOCUMENTS

| EP | 0885605 A1  | 12/1998 |
|----|-------------|---------|
| GB | 2141980 A   | 1/1985  |
| JP | 2005028095 A| 3/2005  |
| WO | 91/07936 A1 | 6/1991  |

OTHER PUBLICATIONS

English Abstract of JP 2005028095, published Mar. 2, 2005 (Matsunaga Seisakusho: KK).

*Primary Examiner* — John R Olszewski
*Assistant Examiner* — Jacob Meyer
(74) *Attorney, Agent, or Firm* — Douglas G. Gallagher; Bingham Greenbaum Doll LLP

(57) ABSTRACT

Wheelchairs in various embodiments include a variable-position drive system that can automatically move the drive wheels fore and aft through an approximately 41 cm range. Such a system provides all the benefits of front-, mid-, and rear-wheel drive configurations in a single wheelchair, for example, to adjust the drive wheels toward the rear for stability and speed outdoors and toward the center for maneuverability indoors. The performance-optimal placement of drive wheels often depends on the physical environment (e.g., terrain), on the combined center of mass of the wheelchair and user, and on the user's cognitive functioning, trunk stability, and driving skills. One disclosed embodiment includes a pair of mid-position drive wheels that can automatically be repositioned forward or backward to accommodate changes in terrain and center of mass, which will improve the power wheelchair's stability and maneuverability and, consequently, safety and ease of use in a wider range of scenarios.

22 Claims, 11 Drawing Sheets

(56) References Cited

U.S. PATENT DOCUMENTS

| | | | |
|---|---|---|---|
| 4,513,832 A | 4/1985 | Engman | |
| 4,794,999 A * | 1/1989 | Hester | 180/8.2 |
| 5,007,655 A * | 4/1991 | Hanna | 280/250.1 |
| 5,011,175 A * | 4/1991 | Nicholson et al. | 280/304.1 |
| 5,346,233 A | 9/1994 | Moser | |
| 5,351,774 A | 10/1994 | Okamoto | |
| 5,547,038 A | 8/1996 | Madwed | |
| 5,575,348 A | 11/1996 | Goertzen et al. | |
| 5,743,545 A | 4/1998 | Kunze et al. | |
| 5,853,059 A | 12/1998 | Goertzen et al. | |
| 5,904,214 A * | 5/1999 | Lin | 180/15 |
| 5,944,131 A | 8/1999 | Schaffner et al. | |
| 6,217,052 B1 | 4/2001 | Slagerman | |
| 6,318,751 B1 | 11/2001 | Slagerman | |
| 6,405,816 B1 * | 6/2002 | Kamen et al. | 180/65.1 |
| 6,419,260 B1 | 7/2002 | Kuroda | |
| 6,428,029 B1 | 8/2002 | Barclay | |
| 6,478,099 B1 | 11/2002 | Madwed | |
| 6,921,100 B2 | 7/2005 | Mantini et al. | |
| 6,938,923 B2 * | 9/2005 | Mulhern et al. | 280/755 |
| 7,175,193 B2 * | 2/2007 | Wu | 280/304.1 |
| 7,182,166 B2 * | 2/2007 | Gray et al. | 180/209 |
| 7,219,924 B2 * | 5/2007 | Mulhern et al. | 280/755 |
| 7,278,653 B2 | 10/2007 | Pelka et al. | |
| 7,426,970 B2 | 9/2008 | Olsen | |
| 7,648,156 B2 * | 1/2010 | Johanson | 280/657 |
| 2001/0020556 A1 * | 9/2001 | Kamen et al. | 180/282 |
| 2002/0023787 A1 * | 2/2002 | Kamen et al. | 180/7.1 |
| 2006/0076169 A1 * | 4/2006 | Brendel et al. | 180/11 |
| 2008/0054596 A1 * | 3/2008 | Johanson | 280/304.1 |

* cited by examiner

ADJUSTABLE MID-WHEEL POWER WHEELCHAIR DRIVE SYSTEM

This application is a nonprovisional of, and claims priority to, U.S. Provisional Application No. 61/250,918, filed Oct. 13, 2009.

FIELD

The present invention relates to land vehicles. More specifically, the present invention relates to an occupant-propelled or battery-powered wheelchair.

DESCRIPTION

Figure 1:
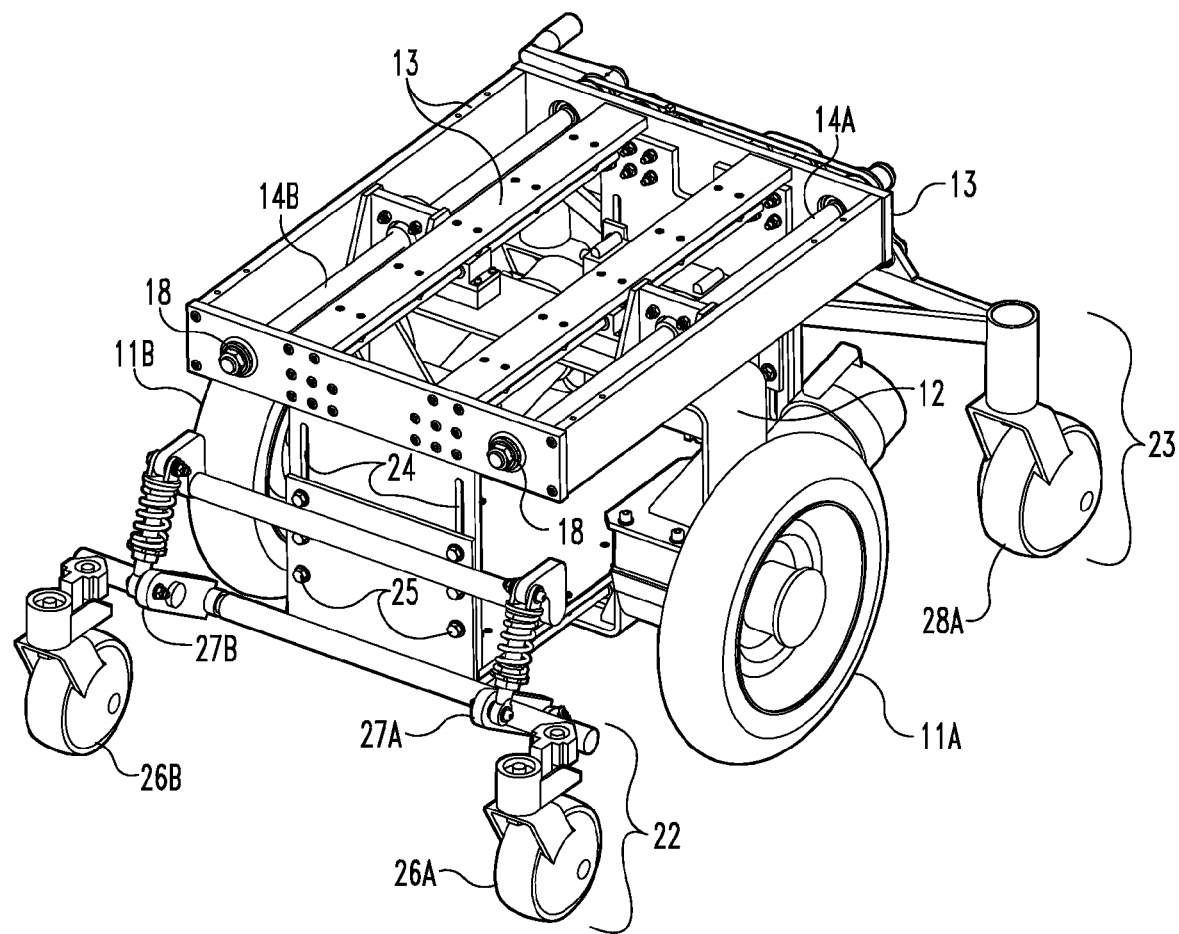
FIG. 1 is a front, upper, left perspective view of a wheelchair base according to one embodiment.
Figure 2:
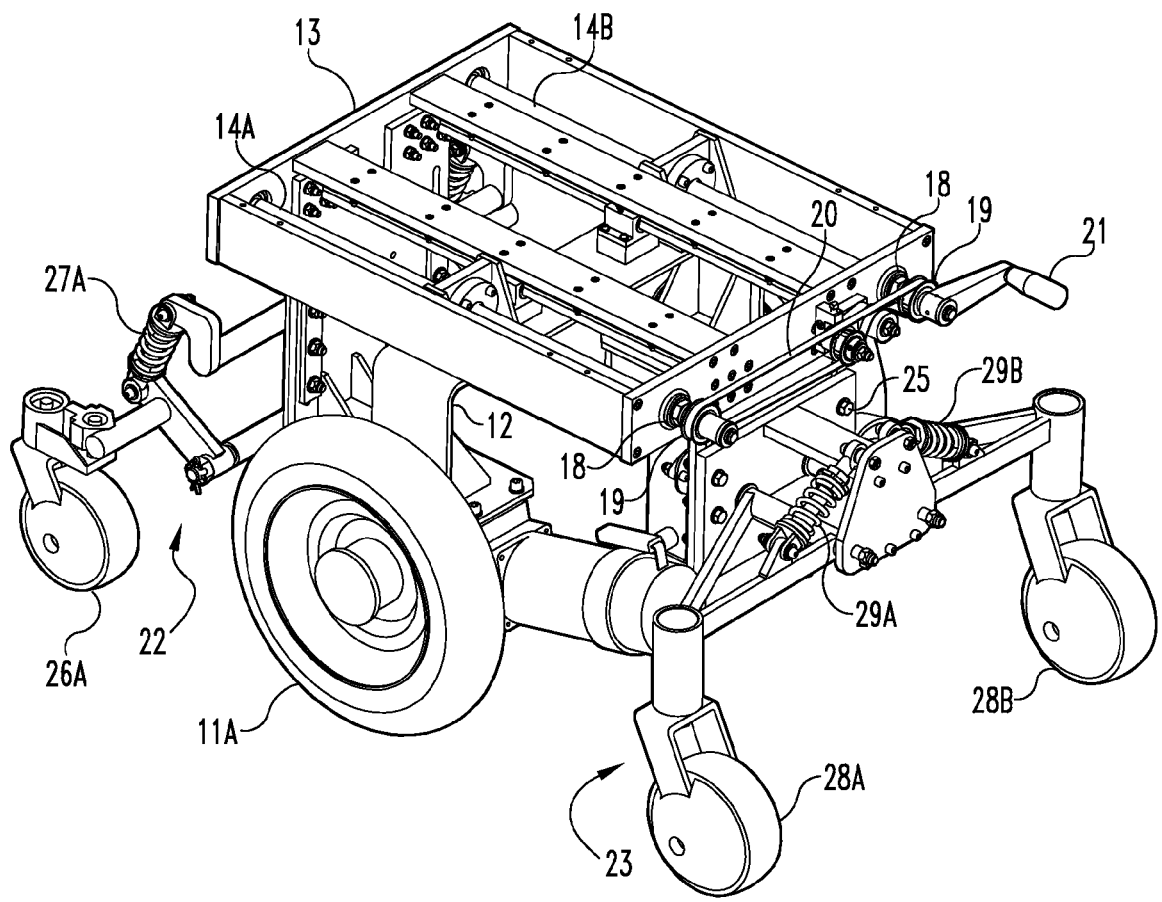
FIG. 2 is a rear, upper, left perspective view of the wheelchair base of FIG. 1.
Figure 3:
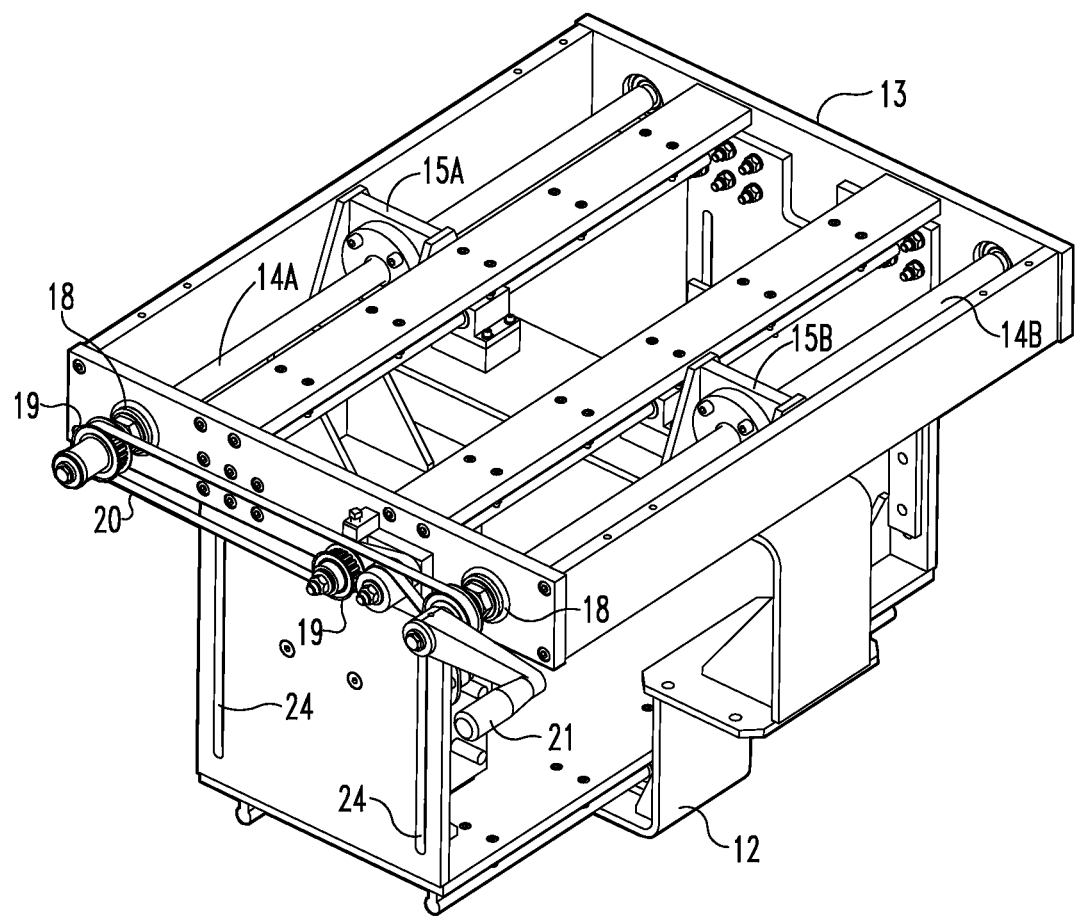
FIG. 3 is a rear, upper, right perspective view, including a gear chain according to one implementation of the embodiment of FIG. 1.
Figure 4:
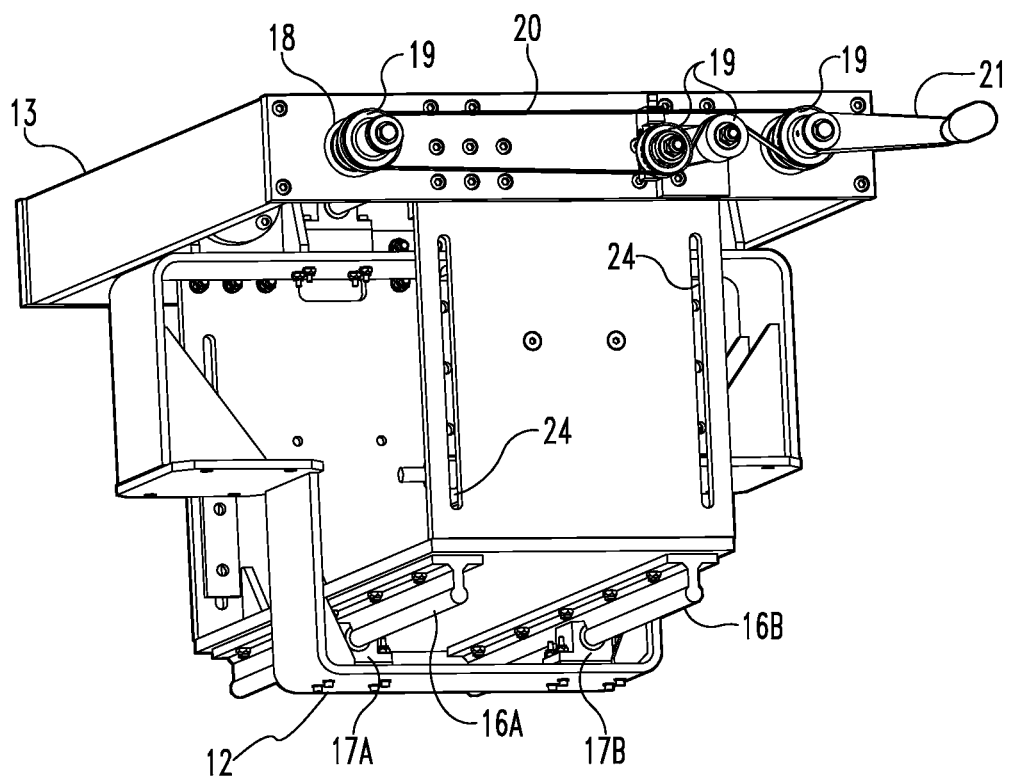
FIG. 4 is a front, lower, left perspective drawing of the drive wheel carriage of the wheelchair base of FIG. 1.
Figure 5:
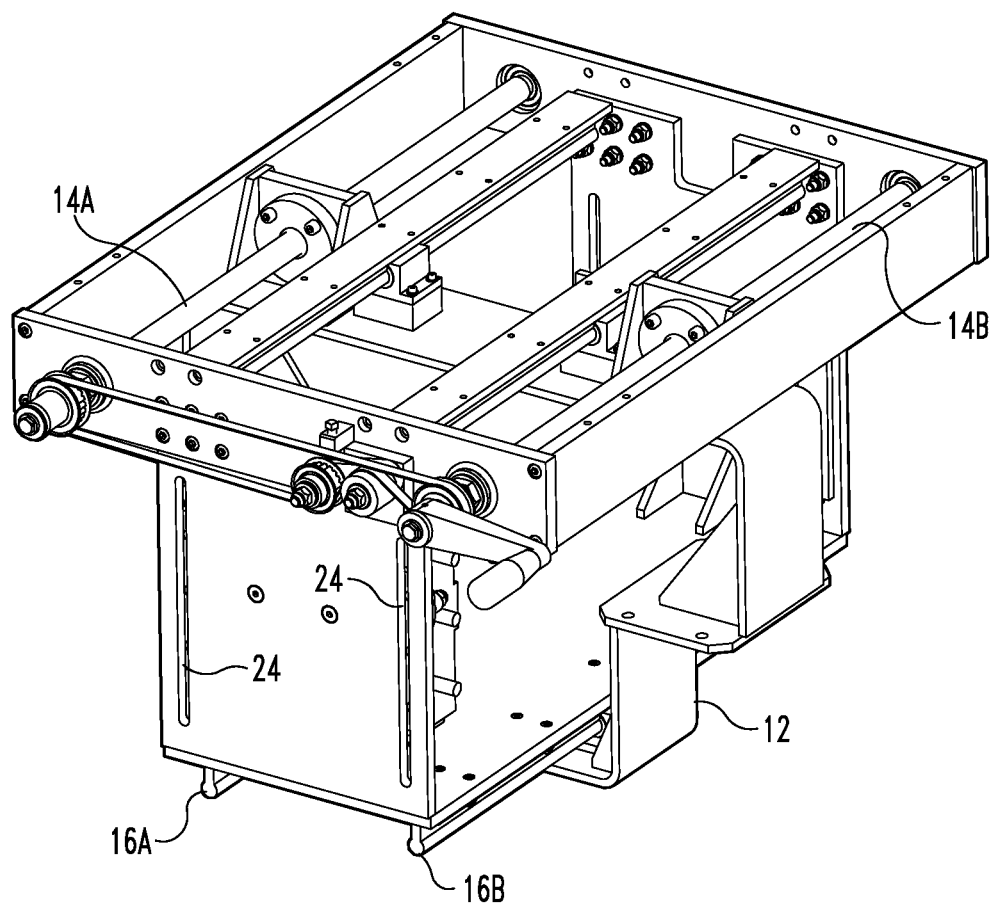
FIG. 5 is a rear, upper, right perspective view of the main frame assembly.
Figure 6:
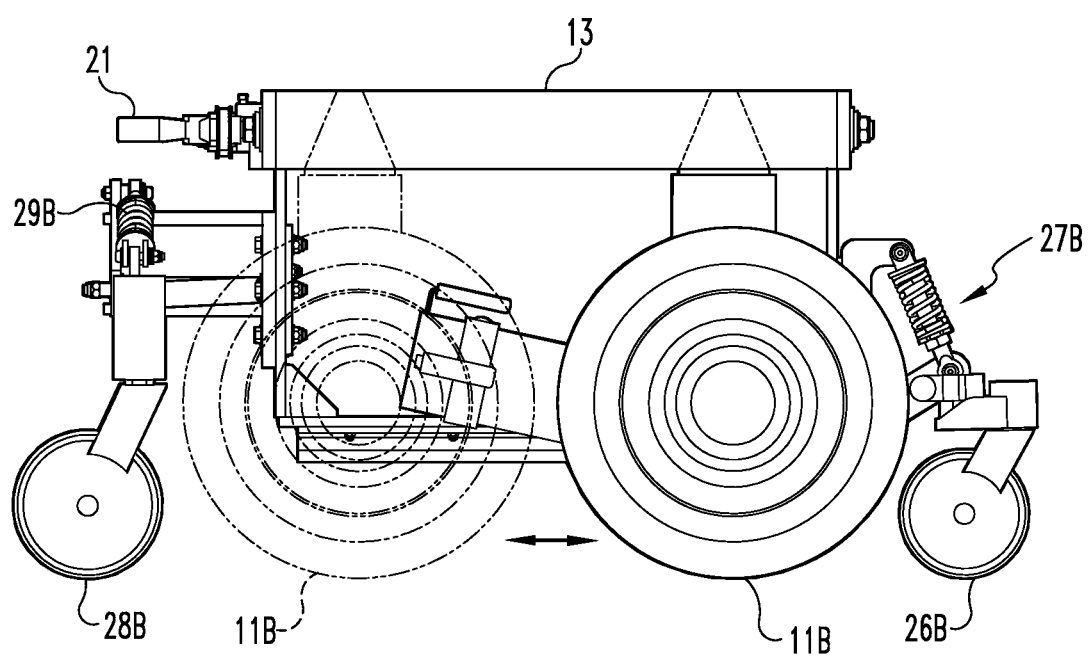
FIG. 6 is a right side view of the drive carriage and drive wheel travel, with the large wheel shown in alternate positions.
Figure 7:
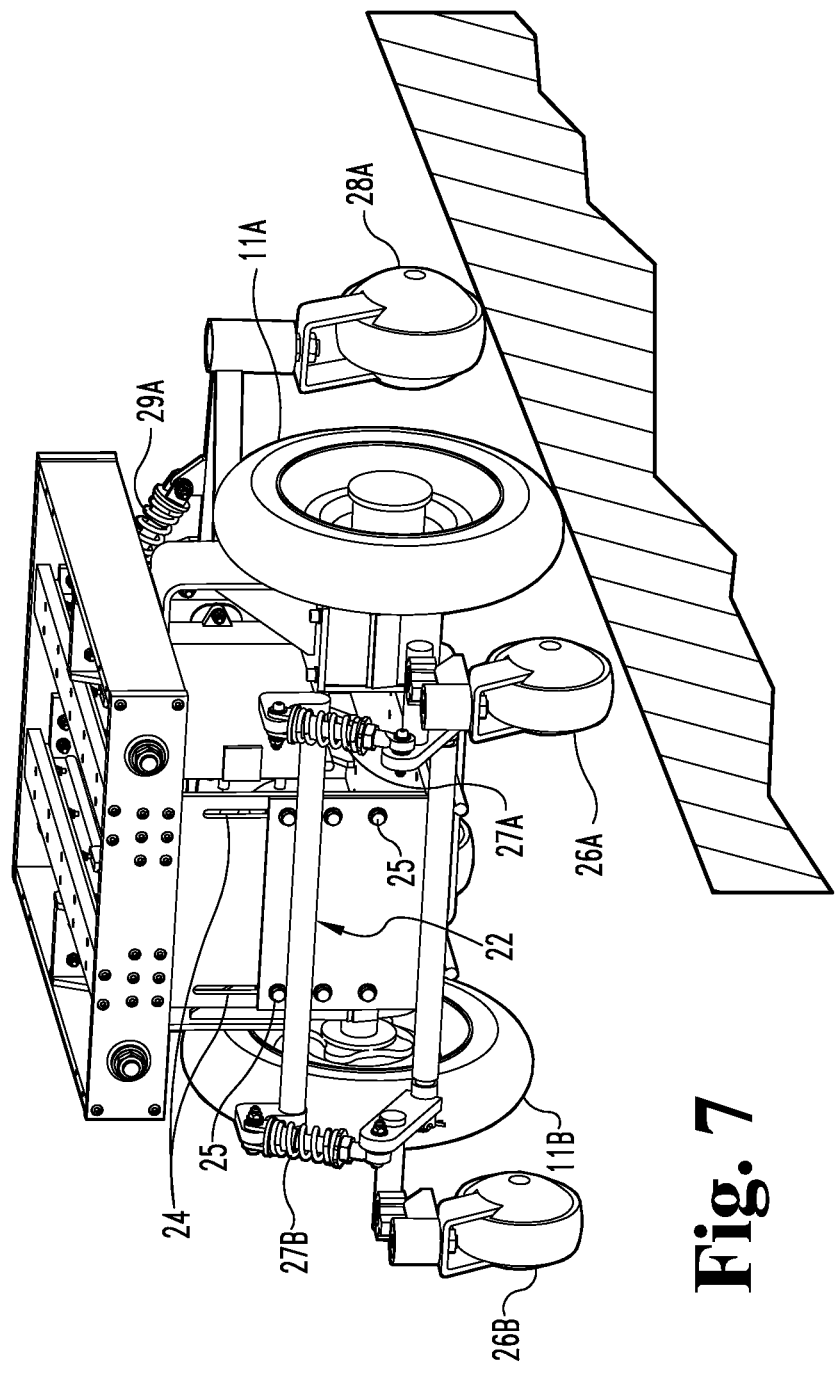
FIG. 7 is a front, left perspective view of the front casters adjusted to a raised position.
Figure 8:
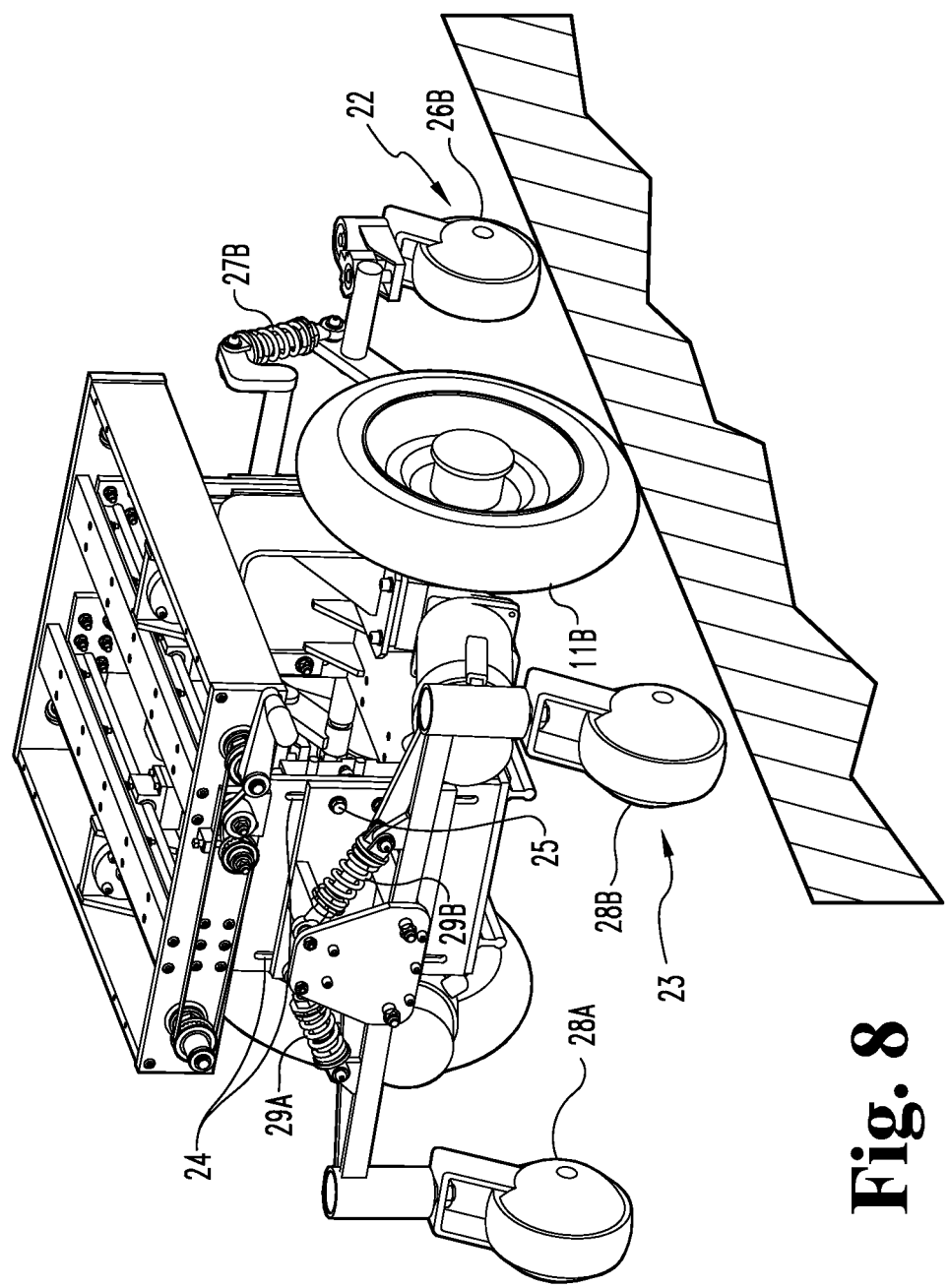
FIG. 8 is a rear, right perspective view of the rear casters adjusted to a raised position.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Three primary drive system configurations for power wheelchairs—front-, mid- and rear-wheel drives—have a wide range of distinct advantages and disadvantages. Users typically select the drive system for their wheelchairs based on their individual needs. Currently, however, no power wheelchair exists that has a variable-position drive system that can automatically be moved fore/aft through a range that can provide the benefits of rear, mid, and front wheel drive configurations.

The wheelchair in this embodiment includes such a variable-position drive system that can be automatically moved through a range of at least about 41 cm. Such a system provides all the benefits of each drive wheel configuration in a single wheelchair, for example, to adjust the drive wheels toward the rear for stability and speed outdoors and toward the center for maneuverability indoors. For early power wheelchairs, the driving force was applied to the rear wheels. Those were followed by power wheelchairs with front-wheel drives, and in recent years power wheelchairs with mid/center wheel drives dominate the market. Each drive wheel system has its advantages and disadvantages and preferred terrain and environment for use. To optimize performance, the placement of drive wheels depends on the physical environmental context (e.g., terrain), on the combined centers of mass of the wheelchair and user, as well as the user's cognitive functioning, trunk stability, and driving skills. The present embodiment includes a pair of mid-position drive wheels that can automatically be repositioned forward or backward to accommodate changes in terrain and center of mass, will improve the power wheelchair's stability and maneuverability and, consequently, safety and ease of use in a wider range of scenarios.

Figure 9:
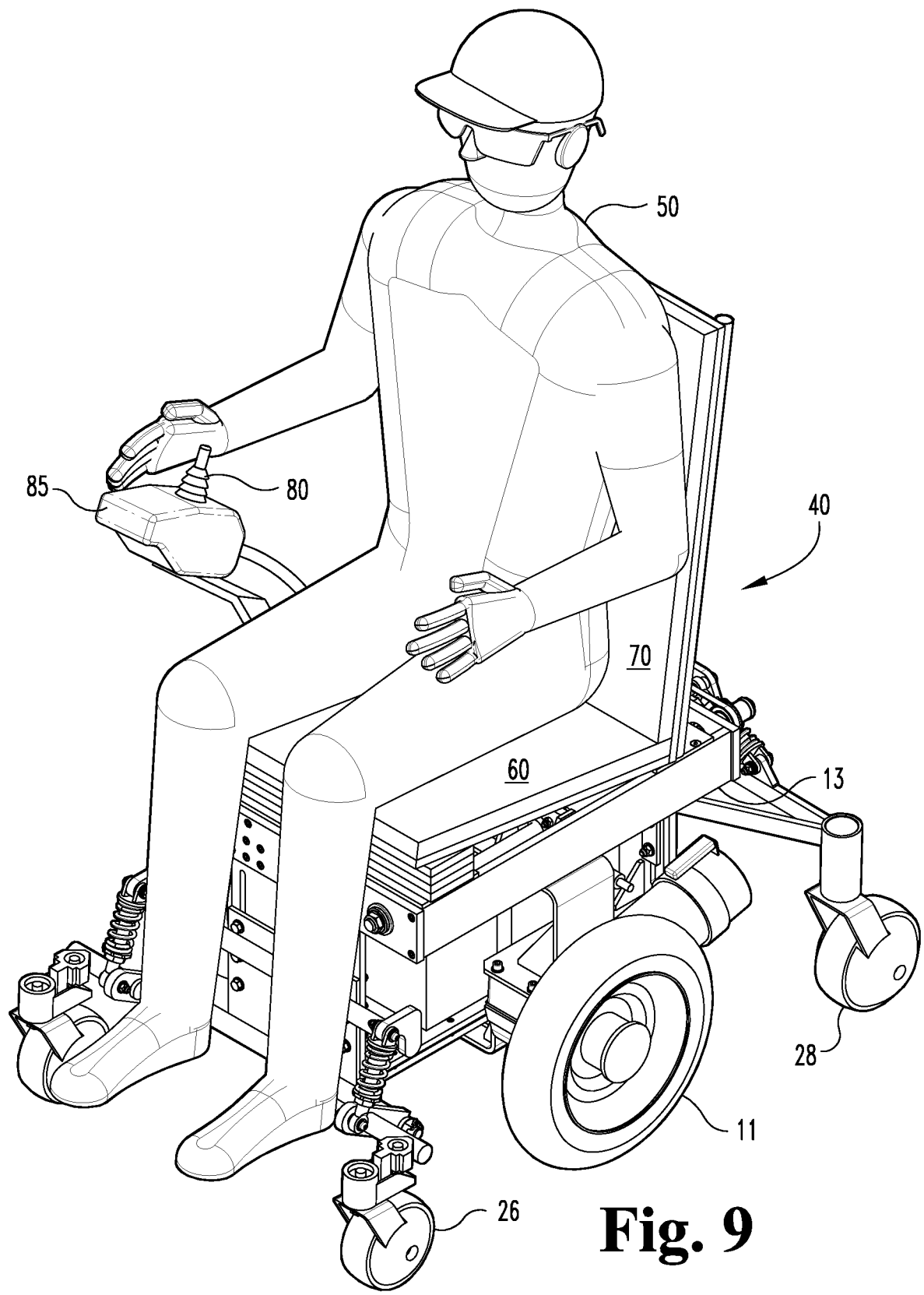
FIG. 9 is a front, upper, left perspective view of a person in a powered wheelchair according to the embodiment of FIG. 1.
Figure 10:
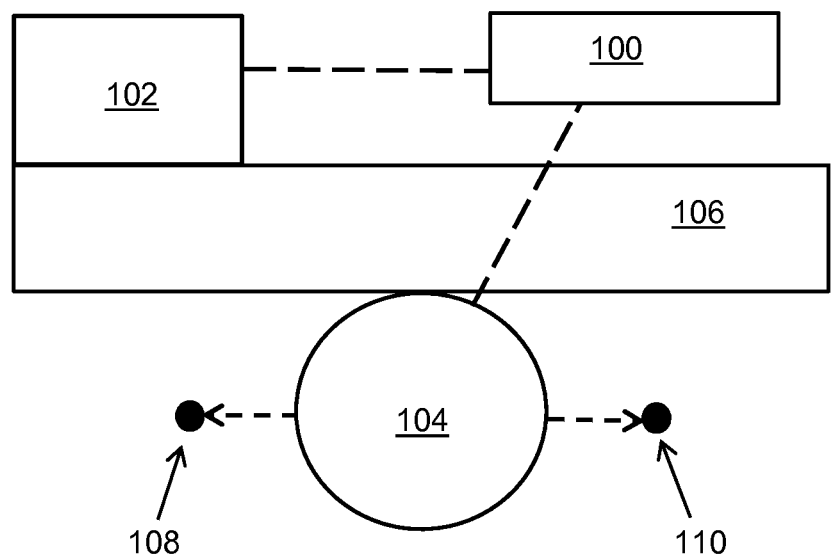
FIG. 10 depicts a motor, a power supply, drive wheels, a frame, a forward position, and a rearward position according to one embodiment.
Figure 11:
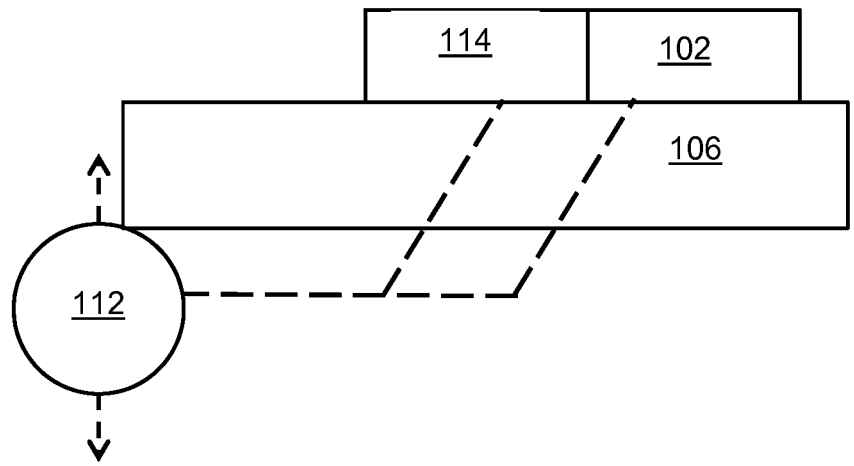
FIG. 11 depicts front casters, a control system, and a power supply according to another embodiment.
Figure 12:
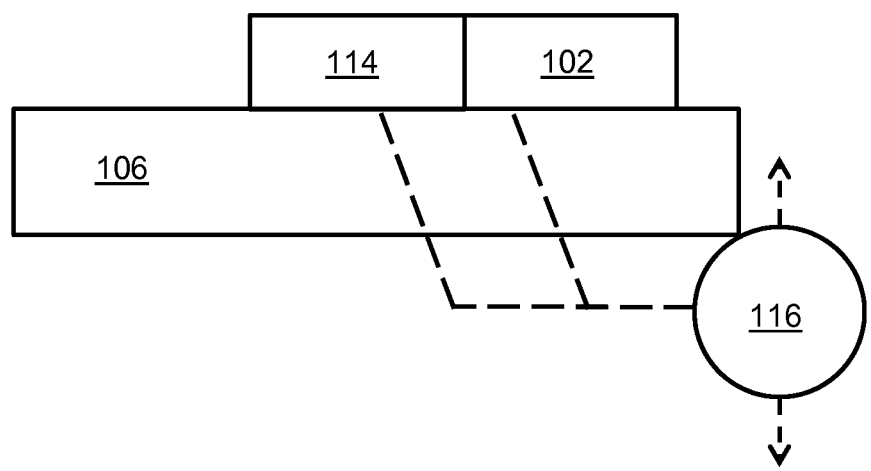
FIG. 12 depicts rear casters, a control system, and a power supply according to still another embodiment.

Generally, one form of the present system is a wheelchair 40, illustrated in FIG. 9, having three pairs of wheels: a pair of large drive wheels 11 in the center of each side, a pair of front casters 26, and a pair of rear casters 28. The center drive wheels 11 may be automatically adjusted forward and backward relative to the rest of the wheelchair 40, and the casters may be automatically moved up or down. This allows the wheelchair 40 to optimally perform over uneven, sloping, rough, or soft outdoor terrain, traverse depressions or rises in the floor or ground with minimal seat/back acceleration and vibration, maintain optimal traction over wet, icy or soft surfaces and shifting weight of person 50, and maneuver as efficiently as possible within crowded or confined spaces. Other forms and embodiments will occur to those skilled in the art in view of the present disclosure.

Turning to FIGS. 1-8, a wheelchair base according to one embodiment of the present system is illustrated in various perspective views without seat 60 and back 70 for clarity. In this embodiment, left and right drive wheels 11A and 11B, respectively, are connected to and held in proper alignment and spacing by the drive wheel carriage 12. In turn, the drive wheels 11A and 11B and drive wheel carriage 12 are connected to the main frame assembly 13 by left and right ACME stainless steel screws 14A and 14B, left and right threaded weldments 15A and 15B, left and right upper carriage bearings 16A and 16B, and left and right lower carriage bearings 17A and 17B. Each ACME screw 14A and 14B is held in alignment and allowed to rotate freely through bearing assemblies 18 placed in the front and rear panels of the main frame assembly 13. Each ACME screw 14A and 14B has a pulley 19A and 19B, respectively, that rigidly attaches to the rear end of each screw. The pulleys 19A and 19B are connected by a tension adjustable pulley belt 20. The left ACME screw 14A has a crank handle 21 rigidly attached to the very outer end of the screw. As crank handle 21 is turned, pulley belt 20 allows both pulleys 19A and 19B and screws 14A and 14B to turn in unison at the same rate and in the same direction through the threaded weldments 15A and 15B. This in turn moves drive wheel carriage 12 and drive wheels 11A and 11B forward and backward along the main frame assembly 13. In this embodiment, the range of this movement is about 16" (41 cm). The combination of the ACME screws 14A and 14B, threaded weldments 15A and 15B, and carriage bearings 16A, 16B, 17A and 17B keep the drive wheels 11A and 11B and drive wheel carriage 12 rigidly and accurately in proper alignment, substantially reducing the likelihood of wracking, twisting, and other unwanted mechanical misalignments.

To accommodate the dynamic differences introduced by rough uneven terrain, heights of the points of ground or floor under the rear, mid, and front wheel positions, and changes in center of mass introduced by movement of the drive wheel carriage assembly 12, the front and rear casters must be adjustable in height. To accomplish this, the main frame assembly 13 has front caster assembly 22 and rear caster assembly 23, each adjustably attached to the main frame assembly 13. The front and rear caster assemblies 22 and 23 are attached to the main frame assembly 13 in machined slots 24 that allow height adjustment by loosening of caster assembly adjustment bolts 25, vertical sliding of front and rear caster assemblies 22 and 23, and re-tightening of the caster assembly adjustment bolts 25. In this embodiment, this is designed to allow a 4" range of vertical movement of the front caster assembly 22, and a 3" range of vertical movement of the rear caster assembly 23.

The front caster assembly 22 has left and right front casters 26A and 26B, which are attached to the front caster assembly 22 with left and right adjustable front caster suspension systems 27A and 27B. The rear caster assembly 23 has left and right rear casters 28A and 28B, which are attached to the rear caster assembly 23 with left and right adjustable rear caster suspension systems 29A and 29B. The adjustable front and rear caster suspension systems 27A, 27B, 29A and 29B allow for the dynamic suspension capability required for the wheelchair to remain stable under all conditions, optimally and safely perform over uneven, sloping, rough, or soft outdoor terrain, and traverse depressions or rises in the floor or ground with minimal seat/back acceleration and vibration.

Note that alternative implementations use different techniques. For example, some embodiments include a motor (e.g., motor 100) powered by a power supply (e.g., power supply 102) and configured to automatically move the drive wheels (e.g., drive wheels 104) relative to the frame (e.g., frame 106) between a forward position (e.g., position 108) and a rearward position (e.g., position 110). Alternate embodiments include two front casters (e.g., casters 112), a control system (e.g., control system 114), and a power supply (e.g., power supply 102) configured to automatically move the front casters up and down. Still other embodiments include rear casters (e.g., casters 116), a control system (e.g., control system 114), and power supply (e.g., power supply 102) configured to automatically move the rear casters up and down. Still further, an alternative automated linear motion system for adjusting the position of drive wheel carriage 12 can be accomplished in one embodiment by a combination of a servo motor, mitered gear transmission box, dual ACME screws, and threaded weldments. Another possible automated linear motion system for adjusting the position of drive wheel carriage 12 can be accomplished in another embodiment by a combination of linear actuators, robust bearing guide system, and automatic drive carriage locking system. In many embodiments of a linear motion system that adjusts the position of the drive wheel carriage 12, the input signal to move the drive wheel carriage 12 is produced directly through user input, such as by a digital joystick 80 (see FIG. 9) or an independent direct switch interface. In many embodiments of a linear motion system that adjusts the position of drive wheel carriage 12, the input signal to move the drive wheel carriage 12 to an alternate position can be interpreted and safely initiated by a smart controller (shown in housing 85) that senses the attitude, speed or acceleration of the wheelchair base and adjusts the position of the drive wheel carriage 12 according to established safety and performance parameters.

In some embodiments, front and rear caster assemblies 22 and 23 are adjusted in height by a motorized or mechanically automated system either automatically or responsively to user input. In one embodiment, the front and rear casters 26 and 28, respectively, are automatically moved up and down by a two-dimensional curved, shaped or extruded cam following system. In some embodiments, both the vertical motion of the casters 26 and 28 and the horizontal motion of the center drive wheels 11 are safely coordinated, controlled and powered with a common smart control system.

Users operate the control system in some embodiments by using a joystick controller 80. The control system only accepts signals from the joystick controller 80 when the drive wheels 11 are in the appropriate horizontal position for the (automatically or manually) chosen drive mode, whether front-, mid-, or rear-wheel drive. The system adjusts the drive wheels 11 into the correct position, then resumes operation according to user input via the joystick. In other embodiments, the control system allows the drive wheels 11 to move, but limits their speed and/or acceleration until their horizontal position is corrected.

In some embodiments, the cams for the cam following system are attached to the drive wheel carriage 12 so that they move horizontally at the same rate as the drive wheel carriage 12, but can move vertically independently of the drive wheel carriage 12 inside machined slots (not shown) in the left and right sides of the carriage. The cams are attached to the front and rear caster assemblies with mechanical linkages. As the drive wheel carriage 12 moves forward or rearward, the cams follow the horizontal carriage movement, as well as the vertical movement initiated by the curved extrusions. As the cams reach, then follow the vertical contours of the extrusions, the mechanical linkages engage and cause the front and rear caster assemblies 22 and 23 to automatically move up and down to the appropriate heights at the appropriate times.

Casters 26A, 26B, 28A, and 28B may be, in various embodiments, a type of caster that would occur to one skilled in the art in view of the present disclosure. Likewise, the structural and mechanical components of a wheelchair implementing the concepts herein may be made of a wide variety of materials, including but not limited to steel, aluminum, carbon fiber, woven composites, and others that will occur to those skilled in the art.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A wheelchair apparatus, comprising:
a frame;
a seat supported by the frame;
a portable power supply and control system supported by the frame;
a pair of drive wheels supporting the frame and configured to move the wheelchair using power from the power supply and inputs from the control system;
one or more front casters supporting the frame;
one or more rear casters supporting the frame; and
a motor powered by the power supply and configured to automatically move the drive wheels
relative to the frame, the front casters, and the rear casters, and
between a forward position and a rearward position, wherein the forward position is forward of a center of gravity of the combination of the wheelchair and its cargo, and the rearward position is at or behind that center of gravity.

2. The wheelchair of claim 1, wherein the rearward drive wheel position is behind the center of gravity.

3. The wheelchair of claim 2, wherein the forward drive wheel position and the rearward drive wheel position are at least about 41 cm apart.

4. The wheelchair of claim 1, wherein the forward drive wheel position and the rearward drive wheel position are at least about 41 cm apart.

5. The wheelchair of claim 1, wherein there are two front casters.

6. The wheelchair of claim 5, further comprising: a mechanical linkage between the two front casters, and wherein the control system and power supply are also configured to automatically move the front casters up and down.

7. The wheelchair of claim 1, wherein there are two rear casters.

8. The wheelchair of claim 7, further comprising: a mechanical linkage between the two rear casters, and wherein the control system and power supply are also configured to automatically move the rear casters up and down.

9. The wheelchair of claim 1, wherein the seat orientation remains at a constant orientation with respect to the front and rear casters as the drive wheels move between the forward position and the rearward position.

10. The wheelchair of claim 1, wherein the seat orientation remains at a constant orientation with respect to a support surface upon which the wheelchair rests as the drive wheels move between the forward position and the rearward position.

11. The wheelchair of claim 1, wherein the center of gravity moves horizontally as the drive wheels move between the forward position and the rearward position.

12. The wheelchair of claim 1, wherein the horizontal distance between the front and rear casters remains constant as the drive wheels move between the forward position and the rearward position.

13. The wheelchair of claim 1, wherein the wheelchair includes an operational configuration with
the drive wheels being in contact with the support surface,
the rear casters being in contact with the support surface, and
the front casters being raised above a support surface.

14. The wheelchair of claim 1, wherein the wheelchair includes an operational configuration with
the drive wheels being in contact with the support surface,
the front casters being in contact with the support surface, and
the rear casters being raised above a support surface.

15. A wheelchair apparatus, comprising:
a frame;
a seat supported by the frame;
a portable power supply and control system supported by the frame;
a pair of drive wheels supporting the frame and configured to move the wheelchair using power from the power supply and inputs from the control system;
one or more front casters connected to the frame;
one or more rear casters connected to the frame; and
a motor powered by the power supply and configured to automatically move the drive wheels
relative to the frame, the front casters, and the rear casters, and
between a forward position and a rearward position, the forward position being separated from the rearward position,
wherein the forward position is at or forward of a center of gravity of the combination of the wheelchair and its cargo, and
the rearward position is at or behind that center of gravity.

16. The wheelchair of claim 15, wherein the rearward drive wheel position is behind the center of gravity.

17. The wheelchair of claim 16, wherein the forward drive wheel position and the rearward drive wheel position are at least about 41 cm apart.

18. The wheelchair of claim 15, wherein the forward drive wheel position is forward of the center of gravity.

19. The wheelchair of claim 18, wherein the forward drive wheel position and the rearward drive wheel position are at least about 41 cm apart.

20. The wheelchair of claim 15, wherein the control system and power supply are also configured to automatically move the front and rear casters up and down.

21. The wheelchair of claim 15, wherein the one or more front casters support the frame and the one or more rear casters are raised above a support surface when the one or more front casters are in contact with the support surface and the center of gravity is between the drive wheels and the front casters.

22. The wheelchair of claim 15, wherein the one or more rear casters support the frame and the one or more front casters are raised above a support surface when the one or more rear casters are in contact with the support surface and the center of gravity is between the drive wheels and the rear casters.

* * * * *